(12) United States Patent
Dessing et al.

(10) Patent No.: US 11,779,152 B2
(45) Date of Patent: Oct. 10, 2023

(54) BEVERAGE DISPENSING DEVICE WITH CLEANING MODULE AND METHOD OF CLEANING SAID DEVICE

(71) Applicant: KONINKLIJKE DOUWE EGBERTS B.V., Utrecht (NL)

(72) Inventors: Jacobus Petrus Maria Dessing, Nieuw-Vennep (NL); Koen Standaar, Soest (NL); Hendrik Johan Dees, Utrecht (NL)

(73) Assignee: KONINKLIJKE DOUWE EGBERTS B.V., Utrecht (NL)

( * ) Notice: Subject to any disclaimer, the term of this patent is extended or adjusted under 35 U.S.C. 154(b) by 597 days.

(21) Appl. No.: 16/612,346

(22) PCT Filed: May 9, 2018

(86) PCT No.: PCT/NL2018/050308
§ 371 (c)(1),
(2) Date: Nov. 8, 2019

(87) PCT Pub. No.: WO2018/208157
PCT Pub. Date: Nov. 15, 2018

(65) Prior Publication Data
US 2020/0170445 A1     Jun. 4, 2020

(30) Foreign Application Priority Data

May 10, 2017   (NL) ...................................... 2018884
May 10, 2017   (NL) ...................................... 2018886

(51) Int. Cl.
*A47J 31/60*   (2006.01)
*A47J 31/46*   (2006.01)
(Continued)

(52) U.S. Cl.
CPC ............... *A47J 31/60* (2013.01); *A47J 31/46* (2013.01); *B08B 3/08* (2013.01); *B08B 3/102* (2013.01);
(Continued)

(58) Field of Classification Search
CPC ................................... A47J 31/60; B67D 1/07
See application file for complete search history.

(56) References Cited

U.S. PATENT DOCUMENTS 3,390,626 A      7/1968  Holstein et al.
4,465,210 A  *   8/1984  Iwanami ............... B08B 9/0323
                                                        222/318
(Continued)

FOREIGN PATENT DOCUMENTS

CH          707837 A1     9/2014
CN          2525935       12/2002
(Continued)

OTHER PUBLICATIONS

DE102012104843—Machine Translation (Year: 2013).*
(Continued)

*Primary Examiner* — Spencer E. Bell
*Assistant Examiner* — Omair Chaudhri
(74) *Attorney, Agent, or Firm* — FITCH, EVEN, TABIN & FLANNERY, LLP (57) ABSTRACT

A method is provided for cleansing a hot beverage dispensing device (1), the device including at least one water inlet (11), a hot beverage preparation module (2) located downstream of the water inlet, and a beverage outlet (26) downstream of the beverage preparation module, a second rinsing step (S2) The method includes a first rinsing step (S1), a second rinsing step (S3). In the first rinsing step at least part of the beverage preparation module and the beverage outlet are rinsed with a rinsing fluid having a first rinsing fluid
(Continued)

temperature. In the treatment step (S2) at least part of the beverage preparation module and the beverage outlet are treated with a treatment fluid, the treatment fluid having a temperature that is higher than the first rinsing fluid temperature. In the second rinsing step (S3) at least part of the beverage preparation module and the beverage outlet are rinsed with a rinsing fluid having a second rinsing fluid temperature.

18 Claims, 11 Drawing Sheets

(51) Int. Cl.
   *B08B 3/08* (2006.01)
   *B08B 9/032* (2006.01)
   *B67D 1/07* (2006.01)
   *B08B 9/023* (2006.01)
   *B08B 3/10* (2006.01)

(52) U.S. Cl.
   CPC ............ *B08B 9/023* (2013.01); *B08B 9/0321* (2013.01); *B67D 1/07* (2013.01); *B67D 2210/00102* (2013.01)

(56) References Cited

U.S. PATENT DOCUMENTS

| | | | |
|---|---|---|---|
| 2003/0201337 A1 | 10/2003 | Carhuff et al. | |
| 2004/0011384 A1 | 1/2004 | Jager | |
| 2004/0118291 A1* | 6/2004 | Carhuff ................ A47J 31/401 | |
| | | | 99/275 |
| 2005/0172833 A1 | 8/2005 | Ioannone | |
| 2005/0233043 A1 | 10/2005 | Dirren | |
| 2006/0213928 A1* | 9/2006 | Ufheil .................... A47J 31/60 | |
| | | | 222/129.1 |
| 2008/0163896 A1* | 7/2008 | Loannone ............... A47J 31/60 | |
| | | | 134/133 |
| 2008/0250935 A1 | 10/2008 | Van Belleghem | |
| 2009/0014464 A1* | 1/2009 | Adbelmoteleb ..... B67D 1/0028 | |
| | | | 222/1 |
| 2009/0038655 A1* | 2/2009 | Coccia .................... A47J 31/60 | |
| | | | 134/115 R |
| 2009/0293733 A1* | 12/2009 | Martin .................... A47J 31/60 | |
| | | | 99/280 |
| 2011/0005407 A1 | 1/2011 | Reyhanloo | |
| 2011/0023723 A1* | 2/2011 | Morin ..................... B67D 1/07 | |
| | | | 99/323.3 |
| 2011/0165019 A1 | 7/2011 | Green | |
| 2011/0220159 A1* | 9/2011 | Ellickson ............. B67D 1/0084 | |
| | | | 134/198 |
| 2012/0291634 A1 | 11/2012 | Startz | |
| 2013/0104742 A1* | 5/2013 | Deo ......................... B67D 1/07 | |
| | | | 99/275 |
| 2013/0140328 A1* | 6/2013 | Gates ........................ B08B 9/02 | |
| | | | 134/22.18 |
| 2013/0146109 A1 | 6/2013 | Cavilia | |
| 2013/0167732 A1 | 7/2013 | Petersen | |
| 2015/0027315 A1* | 1/2015 | Lussi .................. A47J 31/4403 | |
| | | | 99/289 R |
| 2015/0135966 A1* | 5/2015 | Hulett ................ G05D 23/1951 | |
| | | | 99/289 R |
| 2015/0298178 A1* | 10/2015 | Hayakawa ............... B67D 1/07 | |
| | | | 99/323.3 |
| 2016/0031695 A1* | 2/2016 | Hecht .................. B67D 1/0086 | |
| | | | 422/24 |
| 2016/0051083 A1 | 2/2016 | Turi | |
| 2017/0013996 A1* | 1/2017 | Buettiker .............. B08B 9/0325 | |
| 2017/0156544 A1* | 6/2017 | Mochida ............... B08B 9/0325 | |
| 2018/0111168 A1* | 4/2018 | Aneson ..................... B08B 3/08 | |
| 2018/0111173 A1* | 4/2018 | Bertness ............... B08B 9/0325 | |
| 2018/0199755 A1 | 7/2018 | Tiedemann | |
| 2018/0332997 A1* | 11/2018 | Kang ......................... B08B 3/08 | |
| 2019/0008315 A1* | 1/2019 | Kim ..................... B67D 1/0086 | |
| | | | 422/24 |
| 2020/0146503 A1* | 5/2020 | Arndt ....................... B67D 1/07 | |
| | | | 99/275 |

FOREIGN PATENT DOCUMENTS

| | | | | |
|---|---|---|---|---|
| CN | 2815226 Y | 9/2006 | | |
| CN | 101316534 A | 12/2008 | | |
| CN | 101947061 A | 1/2011 | | |
| CN | 101947061 B | 4/2013 | | |
| CN | 104168803 A | 11/2014 | | |
| CN | 105795910 A | 7/2016 | | |
| CN | 105996765 A | 10/2016 | | |
| CN | 106419549 A | 2/2017 | | |
| CN | 106419553 A | 2/2017 | | |
| CN | 104168803 B | 3/2017 | | |
| CN | 106510472 A | 3/2017 | | |
| DE | 20 2010 010 509 U1 | 10/2011 | | |
| DE | 10 2012 104 843 A1 | 12/2013 | | |
| DE | 102012104843 A1 * | 12/2013 | ............. | A47J 31/60 |
| DE | 10 2015 104 146 A1 | 9/2016 | | |
| DE | 102016100715 A1 * | 7/2017 | | |
| EP | 1 688 388 A1 | 8/2006 | | |
| EP | 2 594 174 A1 | 5/2013 | | |
| EP | 2 869 066 A1 | 5/2015 | | |
| EP | 2869066 A1 * | 5/2015 | ............. | A47J 31/60 |
| EP | 2992793 | 3/2016 | | |
| JP | 55132694 | 9/1955 | | |
| JP | 07089594 | 4/1995 | | |
| JP | 200491050 | 3/2004 | | |
| JP | 2005312959 | 11/2005 | | |
| JP | 2006512642 | 4/2006 | | |
| JP | 200894499 | 4/2008 | | |
| JP | 2010533623 | 10/2010 | | |
| JP | 2012239913 | 12/2012 | | |
| RU | 2549060 | 4/2015 | | |
| WO | 2005005905 | 1/2005 | | |
| WO | 2011095511 | 8/2011 | | |
| WO | 2013135901 | 9/2013 | | |
| WO | 2016198442 A1 | 12/2016 | | |
| WO | 2017005831 A1 | 1/2017 | | |

OTHER PUBLICATIONS

International Search Report and Written Opinion, PCT/NL2018/050307 (dated Sep. 10, 2018).
International Search Report and Written Opinion, PCT/NL2018/050308 (dated Oct. 2, 2018).

* cited by examiner

BEVERAGE DISPENSING DEVICE WITH CLEANING MODULE AND METHOD OF CLEANING SAID DEVICE

CROSS-REFERENCE TO RELATED APPLICATIONS

This application is a National Stage Application of PCT/NL2018/050308, filed May 9, 2018, which claims the benefit of and priority to Netherlands Patent Application No. NL 2018886, filed May 10, 2017, and Netherlands Patent Application No. NL 2018884, filed May 10, 2017, the entire contents of all three are hereby incorporated herein by reference.

BACKGROUND

Hot beverage dispensing devices are commonly known that are capable of preparing a variety of hot beverages from water and one or more ingredients. A hot beverage dispensing device typically includes at least one water inlet, a hot beverage preparation module located downstream of the water inlet, and a beverage outlet downstream of the beverage preparation module. Such devices may for example prepare varieties of coffee, soup, hot milk, hot chocolate milk and the like. After each beverage dispensing action residues of ingredients remain in the device. Accordingly, it is important to regularly clean the device to avoid serious contaminations and potential food safety hazards.

EP2531085 discloses a hot beverage dispensing device that is provided with a cleaning arrangement. During a cleaning cycle, pressurized gas, e.g. a mixture of steam and air is passed through the various components of the device to remove such residues. In devices for dispensing a variety of beverages, this measure may not always be sufficient.

SUMMARY

Accordingly, it is an object of the invention to provide an improved method for cleaning a hot beverage dispensing device, as well as a hot beverage dispensing device having an improved cleaning module.

In accordance with the invention there is provided an improved method for cleaning a hot beverage dispensing device as claimed in claim 1.

In accordance with the invention, there is further provided a hot beverage dispensing device having an improved cleaning module as claimed in claim 15.

The improved method for cleaning a hot beverage dispensing device comprises a sequence of at least a first rinsing step, a treatment step and a second rinsing step.

The first rinsing step comprises rinsing at least part of the beverage preparation module and the beverage outlet with a rinsing fluid having a first rinsing fluid temperature. The treatment step comprises treating at least part of the beverage preparation module and the beverage outlet with a treatment fluid. The treatment fluid has a temperature that is higher than the first rinsing fluid temperature. The second rinsing step comprises rinsing at least part of the beverage preparation module and the beverage outlet with a rinsing fluid having a second rinsing fluid temperature.

In addition to the water inlet, hot beverage preparation module and beverage outlet referred to above which serve to deliver a prepared beverage to a receptacle in a first operational mode of the device, the improved hot beverage device further comprises a cleaning module. In a second operational mode of the device, the cleaning module subsequently performs a first rinsing step, a treatment step and a second rinsing step as specified above.

The sequence of at least a first rinsing step, a treatment step and a second rinsing step as performed by the improved method, and as performed by the cleaning module in the second operational mode provide an improved cleaning of the device. This is most beneficial for applications where the hot beverage preparation device is used for preparation of a variety of different beverages.

As a further improvement of the effectiveness of the treatment step, the treatment fluid may be provided with an active ingredient, for example, a detergent, an antibacterial agent and/or a descaling substance.

Depending on the nature of the treatment step, a temperature of the treatment fluid is at least 50° C., preferably at least 60° C. Even higher temperatures may be set for a descaling step, for example at least 80° C., preferably at least 90° C.

In one embodiment of the invention, at least one of the steps comprises the first rinsing step and the second rinsing step is carried out using cold or lukewarm water. Using cold, or preferably lukewarm water in the first rinsing step effectively removes at least a substantial amount of residue in the rinsed parts of the device, while avoiding a solidification of proteins. Using cold or lukewarm water in the second rinsing step cools down the rinsed parts of the system. A relatively fast cooling is achieved using cool rinsing water, however lukewarm water may alternatively be used, for example to mitigate against any risk of thermal shock, for example after a descaling treatment at high temperatures. The second rinsing step may further remove any residues of detergents, or other treatment agents if these were used during the treatment step.

In such an embodiment treatment fluid leaves a beverage outlet and is collected and reused. This is advantageous in that an active ingredient can be used more effectively, and in that less energy is required to maintain the treatment fluid at the required temperature. It may also be contemplated to collect and reuse the rinsing fluid during the first and/or the second rinsing step. In that case, the collected rinsing and/or treatment fluid may, for example pass through a filter before it is reused to filter out contaminants present therein.

In a further improved embodiment of the invention, a gas is introduced to the flow of rinsing fluid or the treatment fluid in a pulsating manner. In this way the effectiveness of the treatment is improved since the gas causes turbulence in the flow of rinsing fluid or the treatment fluid. Moreover, this is particularly advantageous for a treatment step requiring high temperatures. The air bubbles present in the flow locally allow for increased temperatures, for example in a heater element, so that, for example a descaling can be performed more effectively.

In yet a further embodiment of the invention, the conductivity of a treatment fluid or rinsing fluid is measured in the second operational mode. In particular, the dispensing of an active ingredient into the fluid may be monitored using a value from the conductivity measurement. In this way it can effectively be verified at the onset of the treatment step that the active ingredient is present in the treatment fluid for proper execution of the treatment step. It can also be verified during the second rinsing step that the active ingredient is no longer present in the treated parts.

A flow rate of the rinsing fluid, or the treatment fluid may be determined by measuring a difference in temperature of the respective rinsing fluid or treatment fluid at two positions in the machine. One position is located downstream of the heater and a second position is located upstream of the heater. In this manner a separate flow meter is avoided and the temperature can be controlled according to the time available. In this way it is also possible to verify the correct functioning of a separate flow meter, if fitted.

According to yet a further embodiment of the invention, a hot beverage preparation module of the hot beverage preparation device comprises a hot water supply section to supply hot water, an ingredient supply section to supply one or more ingredients, and a combining section to prepare a beverage from the supplied hot water and the supplied one or more ingredients to a beverage supply outlet for supply of the prepared beverage to a receptacle.

A fluid interface may be provided between the cleaning module and the hot beverage preparation module. The fluid interface may comprise a flow redirection facility to selectively redirect a flow of rinsing/treatment fluid from the cleaning module upstream or downstream of a heater in the hot water supply section. The fluid interface with the redirection facility enables an efficient reuse of the cleaning device to descale the device.

In an alternative embodiment of the invention, the hot beverage dispensing device comprises a fluid transport trajectory with at least one of a pump and a heater, wherein the device in its first operational mode provides an ingredient as a component of the hot beverage via the fluid transport trajectory to the beverage outlet, and wherein the device in its second operational mode induces a flow of rinsing or treatment fluid through the fluid transport trajectory. In this manner, parts of the hot beverage preparation device are efficiently reused for cleaning the device.

The fluid transport trajectory may further comprise one or more sensors, such as a conductivity sensor, a flow sensor, or a temperature sensor. The sensor arranged in the fluid transport trajectory may be used for carrying out various measurements for performance verification during the first and the second operational mode.

In yet a further embodiment of the improved hot beverage dispensing device, an inlet of the fluid transport trajectory is coupled via a selection valve to an ingredient reservoir for said ingredient and a rinsing/treatment fluid reservoir. In the first operational mode and the second operational mode, the selection valve respectively selects the ingredient reservoir and the rinsing/treatment fluid reservoir as inputs for the fluid transport trajectory. This allows for a rapid and efficient transition between the first and the second operational modes.

It is noted that two or more embodiments of an improved beverage device as specified above may be combined into a beverage dispensing system.

An improved hot beverage dispensing device may further comprise a flow direction element arranged upstream of the outlet, which is configured to selectively re direct a flow of fluid streaming in a direction of the outlet towards a rinsing/treatment fluid reservoir. In this way an effective circulation of rinsing/treatment fluid is achieved. Alternatively, rinsing/treatment may be collected at a collection tray.

In an alternative improved hot beverage dispensing device a fluid capture element is provided that is arranged downstream of the outlet. In this embodiment, the hot beverage dispensing device is configured to selectively couple the fluid capture element with the outlet to capture fluid leaving the outlet and to re direct the fluid towards a rinsing/treatment fluid reservoir. This is advantageous in that the rinsing/treatment fluid also rinses/treats the outlet, while providing a more effective re circulation than would be the case if the fluid is collected from a collection tray having a relatively large surface on which an amount of rinsing/treatment fluid could remain as droplets.

BRIEF DESCRIPTION OF THE DRAWINGS

The invention will now be described, by way of example only, with reference to the following drawings, in which.

DETAILED DESCRIPTION OF EMBODIMENTS

Figure 1:
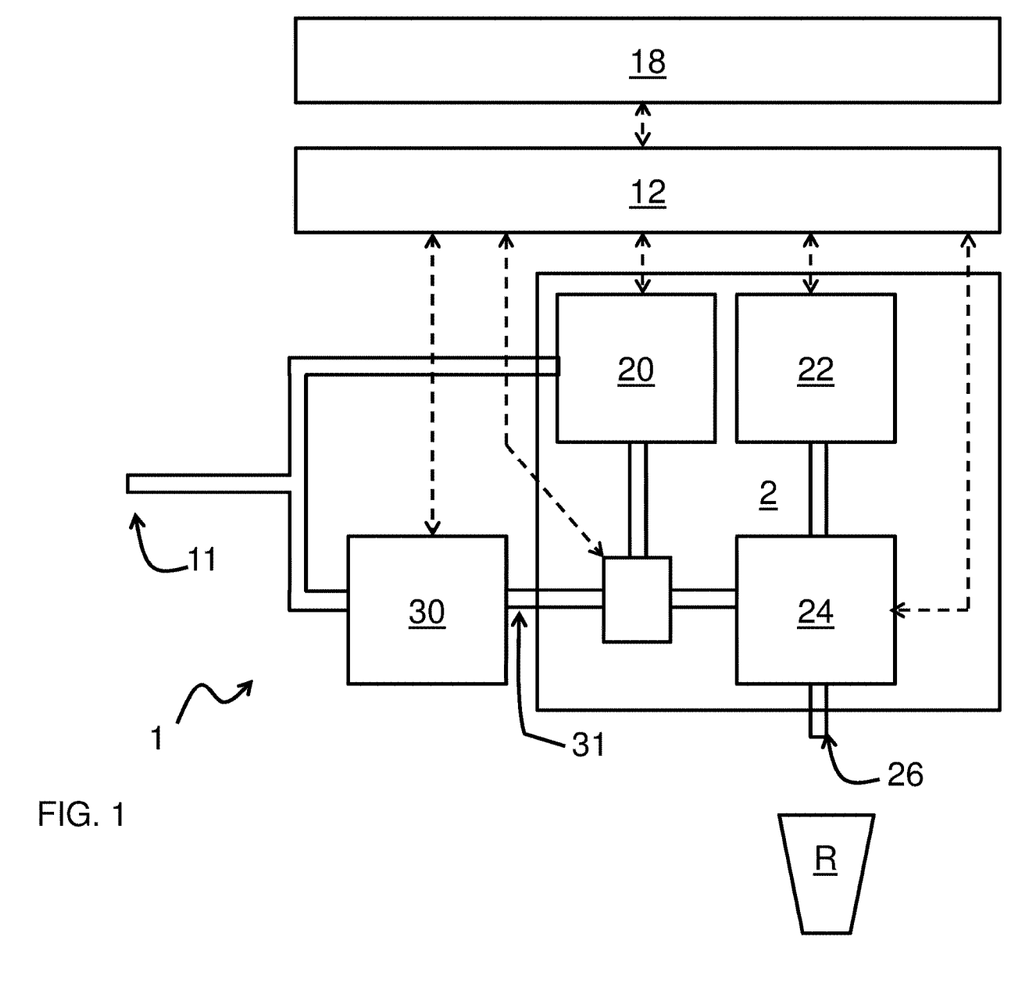
FIG. 1 schematically illustrates an embodiment of a hot beverage preparation device according to the present invention, FIG. 2 schematically illustrates an embodiment of a method according to the present invention, FIG. 3 schematically illustrates a further embodiment of a hot beverage preparation device according to the present invention, FIG. 4A schematically illustrates a first step of an embodiment of a method according to the present invention performed in the device of FIG. 4, FIG. 4B schematically illustrates a second step of an embodiment of a method according to the present invention performed in the device of FIG. 4, FIG. 4C schematically illustrates a third step of an embodiment of a method according to the present invention performed in the device of FIG. 4, FIG. 5A schematically illustrates a fourth step of an embodiment of a method according to the present invention performed in the device of FIG. 4, FIG. 5B schematically illustrates a fifth step of an embodiment of a method according to the present invention performed in the device of FIG. 4, FIG. 6 schematically illustrates FIG. 3 schematically illustrates a further embodiment of a hot beverage preparation device according to the present invention, FIG. 6A schematically illustrates a part of an alternative embodiment of a hot beverage preparation device according to the present invention.

FIG. 1. schematically shows a hot beverage dispensing device 1. The device comprises at least one water inlet 11, a hot beverage preparation module 2 located downstream of the water inlet, and a beverage outlet 26 located downstream of the beverage preparation module for delivery of a prepared beverage to a receptacle in a first operational mode M0 of the device. The preparation and delivery of a hot beverage is schematically indicated as a step S0 in FIG. 2. In practice step S0 involves a plurality of substeps known as such to the skilled person. The hot beverage dispensing device further comprises a cleaning module 30.

Figure 2:
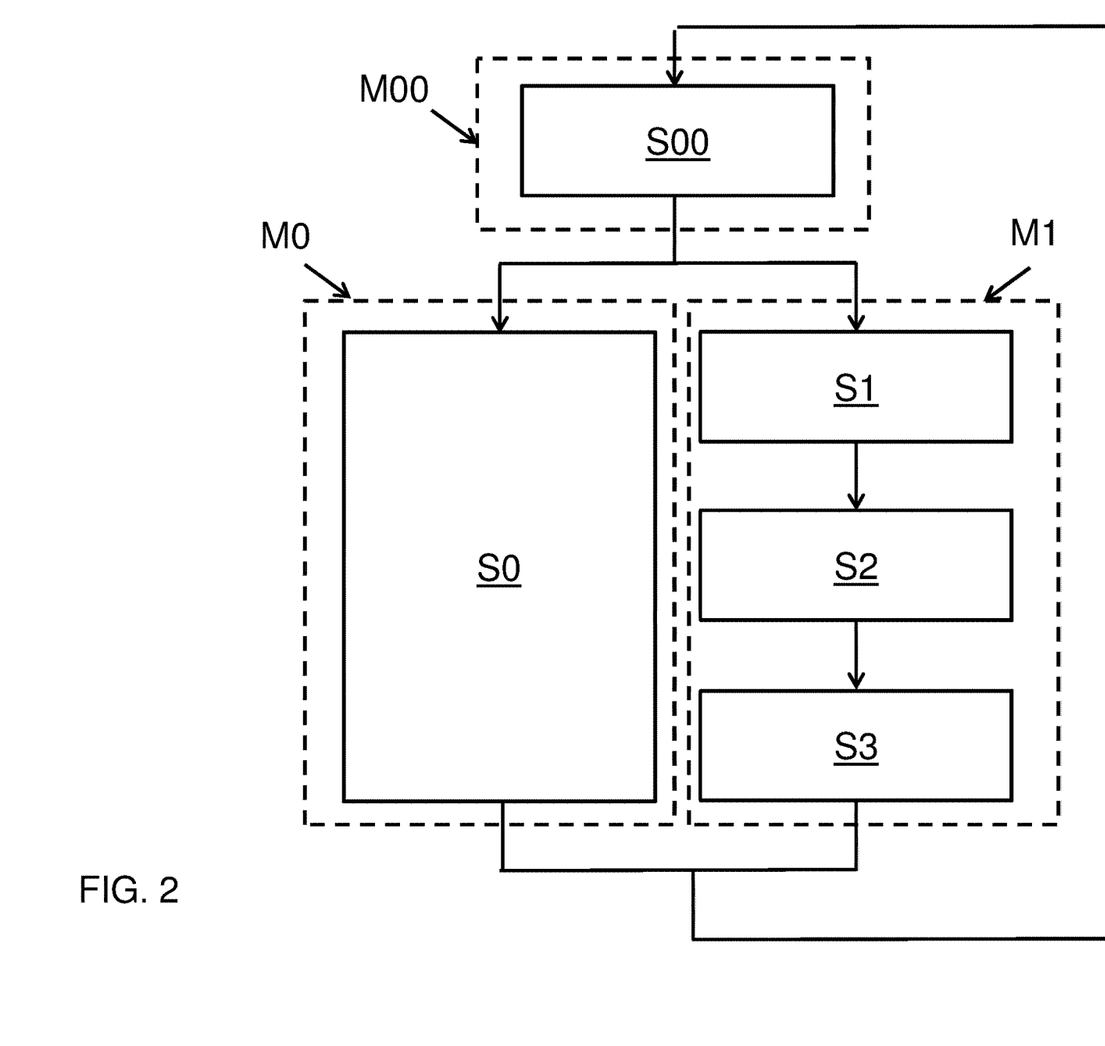

In a second operational mode M1 of the device, the cleansing module 30 subsequently performs a first rinsing step S1, a treatment step S2 and a second rinsing step S3 as shown in FIG. 2. In the first rinsing step S1 at least part of the beverage preparation module and the beverage outlet is rinsed with a rinsing fluid having a first rinsing fluid temperature. In the treatment step S2 at least part of the beverage preparation module 2 and the beverage outlet 26 is treated with a treatment fluid having a temperature that is higher than the first rinsing fluid temperature. In the second rinsing step S3 at least part of the beverage preparation module 2 and the beverage outlet 26 is rinsed with a rinsing fluid having a second rinsing fluid temperature. Upon completion, the device assumes a standby mode M00, wherein it waits S00 for preparation instructions, for example, as provided from a user interface 18, for example a graphical user interface.

The rinsing fluid as used in the first rinsing step may be water, or another fluid like air, or a combination thereof at a relatively low temperature, e.g. in a range of 10 to 40 degrees ° C. The first rinsing step substantially flushes any milk and/or coffee residues from the rinsed parts of the device and the outlet 26. In particular, rinsing with lukewarm water having a temperature in the range of 35 to 40 degrees ° C. substantially dissolves fats present in these parts, while avoiding a solidification of proteins. The used rinsing fluid leaving the outlet 26 is typically collected and drained away.

In the second step S2, the relevant parts are treated with a treatment fluid having a temperature that is higher than the first rinsing fluid temperature. For example, the temperature of the treatment fluid may be at least 50° C. and preferably at least 60° C. The treatment of the treatment fluid in this second step is very effective, due to its relatively high temperature, while solidification of proteins is prevented due to their removal during the first step. The treatment fluid may be water that is provided with an active ingredient, for example an antibacterial agent and/or a descaling substance. Also, other treatment fluids, such as alcohol may be considered for this purpose. In step S2, the treatment fluid leaving the beverage outlet may be collected and re used. This is advantageous in that an active ingredient can be used more effectively, and in that less energy is required to maintain the treatment fluid at the required temperature. It may also be contemplated to collect and re use the rinsing fluid in step S1. In that case, the collected rinsing fluid may, for example, pass through a filter before it is re used to filter out contaminants present therein.

In the third step S3, the relevant parts are rinsed with a rinsing fluid having a second rinsing fluid temperature. In this step any ingredients used during the treatment step S2 are flushed out through the outlet. Cold water is typically used in this step, which cools down the relevant part of the device for normal operation. Generally, fresh tap water is suitable for this purpose. In some cases an inlet filer may be applied, or the rinsing fluid may be provided from a separate source. Also for this step S3 it may be contemplated to collect and re use the treatment fluid leaving the beverage outlet. For example, means may be provided that alternately allow an amount of rinsing fluid to circulate within the relevant parts and to flush rinsing fluid for replacement by a fresh amount of rinsing fluid.

Figure 3:
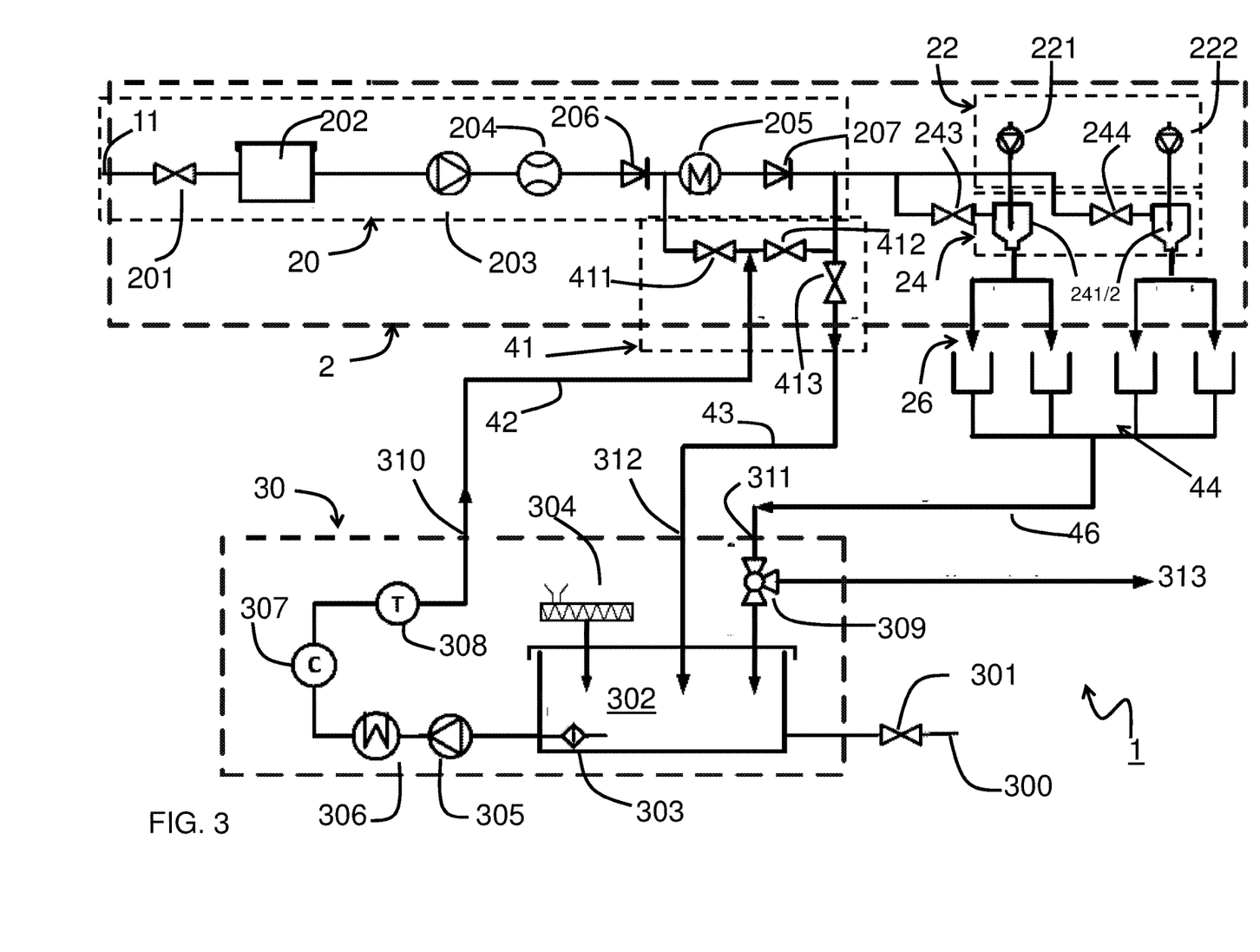

An example of an improved hot beverage preparation device 1 is illustrated in more detail in FIG. 3. The hot beverage dispensing device 1 comprises a hot beverage preparation module 2 having a hot water supply section 20 to supply hot water, an ingredient supply section 22 to supply one or more ingredients, and a combining section 24 to prepare a hot beverage from the supplied hot water and the supplied one or more ingredients. The hot beverage as prepared in a first operational mode is supplied via the outlet 26 to a receptacle (not shown).

In the embodiment shown, the hot water supply section 20 includes an inlet valve 201, a water reservoir 202, a pump 203, a flow meter 204 and a boiler 205 downstream of the inlet 11. These parts may be controllable by a controller 12 as shown in FIG. 1, and/or may provide output signals to the controller 12.

In the exemplary embodiment shown in FIG. 3, ingredient supply section 22 includes a first ingredient supply element 221 to supply coffee, and a second ingredient supply element 222 to supply milk. It will be understood that in practice further ingredient supply elements may be present, for example for the supply of hot chocolate or soup.

The combining section 24 comprises combining elements 241/2, here in the form of water jet mixers for mixing the supplied ingredients with water.

In the embodiment shown in FIG. 3, the cleaning module 30 comprises an inlet valve 301, a reservoir 302, an inlet filter 303, a pump 305, a heater 306, a conductivity sensor 307, and a temperature sensor 308 downstream of a water inlet 300. It is noted that these elements may also be provided in another order. Preferably, however the pump 305 is arranged downstream of the reservoir 302. The cleaning module 30 further comprises a treatment agent dispenser 304 to dispense a treatment agent in the water reservoir, for example, a descaling agent, an anti-bacterial agent, or a detergent. The cleansing module 30 has an outlet 310 to provide the rinsing, or treatment fluid to the hot beverage preparation module 2 and an inlet 311 to receive collected rinsing or treatment fluid from the hot beverage preparation module 2. The cleaning module 30 further includes a multi-way valve 309 to direct returned fluid to either the reservoir 302, or towards a drain outlet 313. An additional inlet 312 is provided to receive rinsing, or treatment fluid from the hot water supply section 20 of the hot beverage preparation module 2.

In the embodiment shown the cleaning module 30 and the hot beverage preparation module 2 are coupled via interface 41. Conduit 42 serves to conduct the treatment/rinsing fluid from outlet 310 to the interface 41. Inlet 311 receives the collected treatment/rinsing fluid via conduit 46 from collector 44. The additional inlet is coupled via conduit 43 to interface 41. A flow of rinsing/treatment fluid between the cleaning module 30 and the hot beverage preparation module 2 is controlled by controllable valves 411, 412, 413, as well as by the controllable multiway valve 309.

In the embodiment shown the hot water supply section 20 is further provided with a first and a second one way valve 206, 207 at each side of the boiler 205.

Operation of the exemplary embodiment in the second mode is now described with reference to FIGS. 4A to 4C. Therein a flow of rinsing/treatment fluid is schematically indicated with dashed arrows. Closed valves or other closed elements are indicated with a cross (X).

Figure 4A:
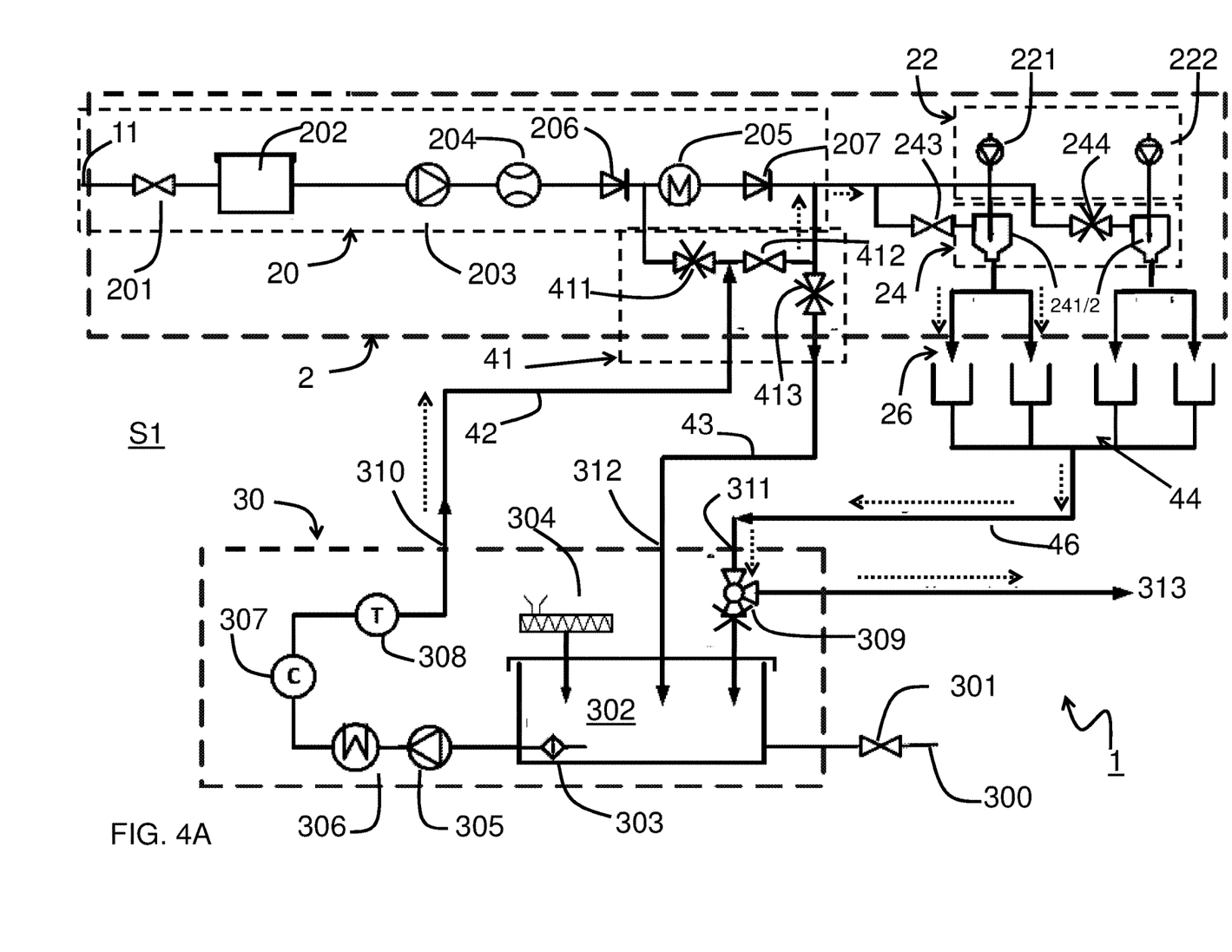

FIG. 4A illustrates the first step S1 in more detail. As shown in FIG. 4A, the pump 305 is activated to pump rinsing fluid from the reservoir 302 to the outlet 310 and via conduit 42 to the interface 41. In this state, the controllable valves 411 and 413 are maintained in a closed position and only valve 412 is opened, so the rinsing fluid flows to the combining section 24. In this case, the first step S1 comprises a first substep wherein controllable valve 243 is opened and controllable valve 244 is maintained in a closed position. In a second substep controllable valve 244 is opened and controllable valve 243 is maintained in a closed position. In this way, the combining elements 241, 242, shown here as waterjet mixers are rinsed in a more intensive manner than would be possible if both were rinsed at the same time. Typically in this step, the multiway valve 309 is set to re direct the rinsing fluid towards an outlet 313. The temperature of the rinsing fluid, usually water, is for example in the range of 20 to 40 degrees ° C.

Figure 4B:
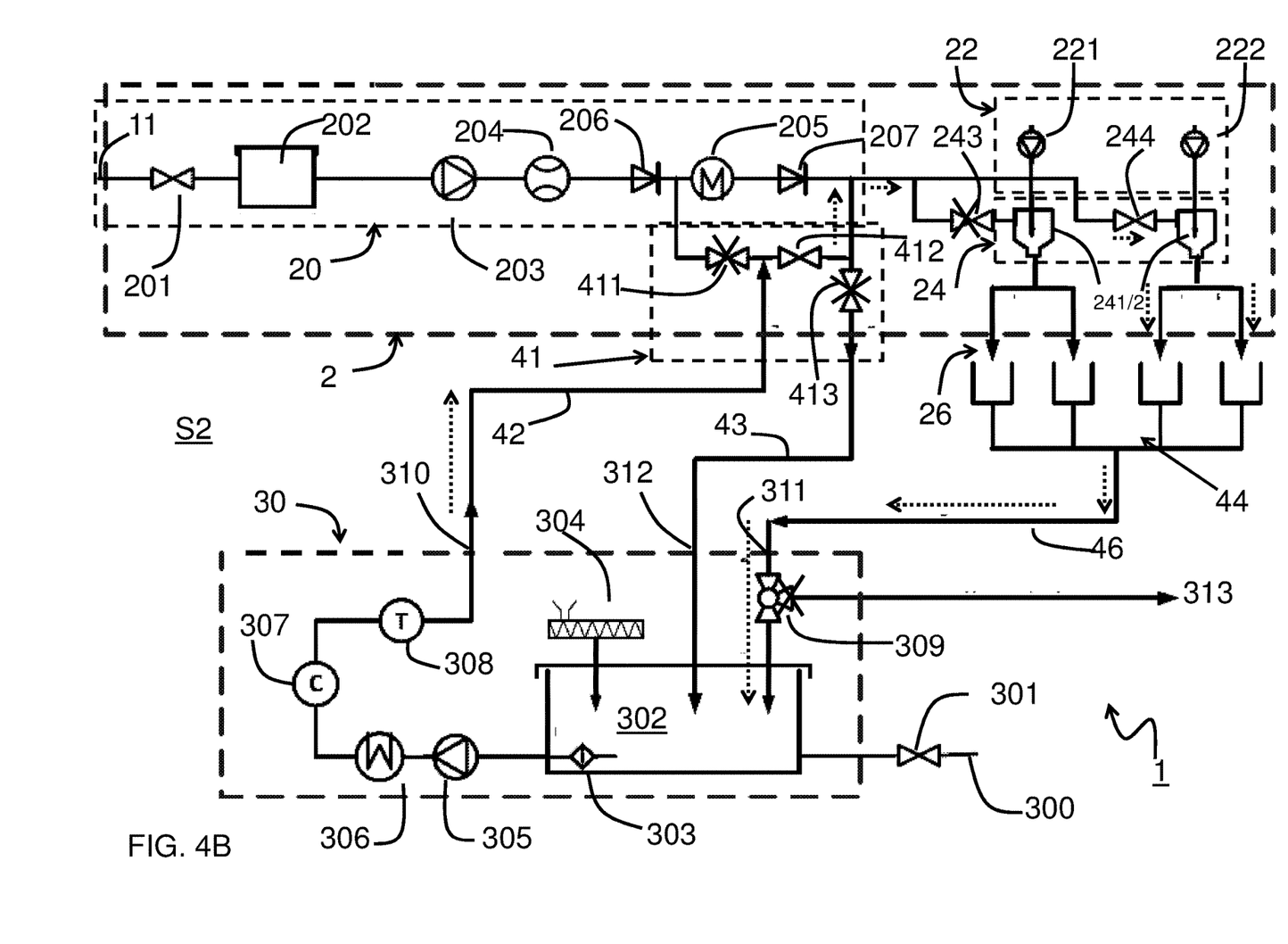

FIG. 4B shows the second step S2 in more detail. In this step the treatment fluid is guided via the conduit 42, via valve 412 to the combining unit 24 to the outlet 26. The treatment fluid leaving the outlet is collected in tray 44 and returned via valve 309 to the reservoir 302. Also in this step the valves 243, 244 may be opened one at a time to provide for a more intensive cleansing of each of the water jet mixers 241, 242, and the associated outlets 26. In this step S2 a treatment agent, for example an anti-bacterial agent and/or a detergent may be released by treatment agent dosing device 304. In this step the temperature of the treatment fluid is increased to a value that is higher than the rinsing fluid temperature in the first step S1, for example the treatment fluid may be increased to a value of at least 50 degrees ° C., for example to 60 degrees ° C.

Figure 4C:
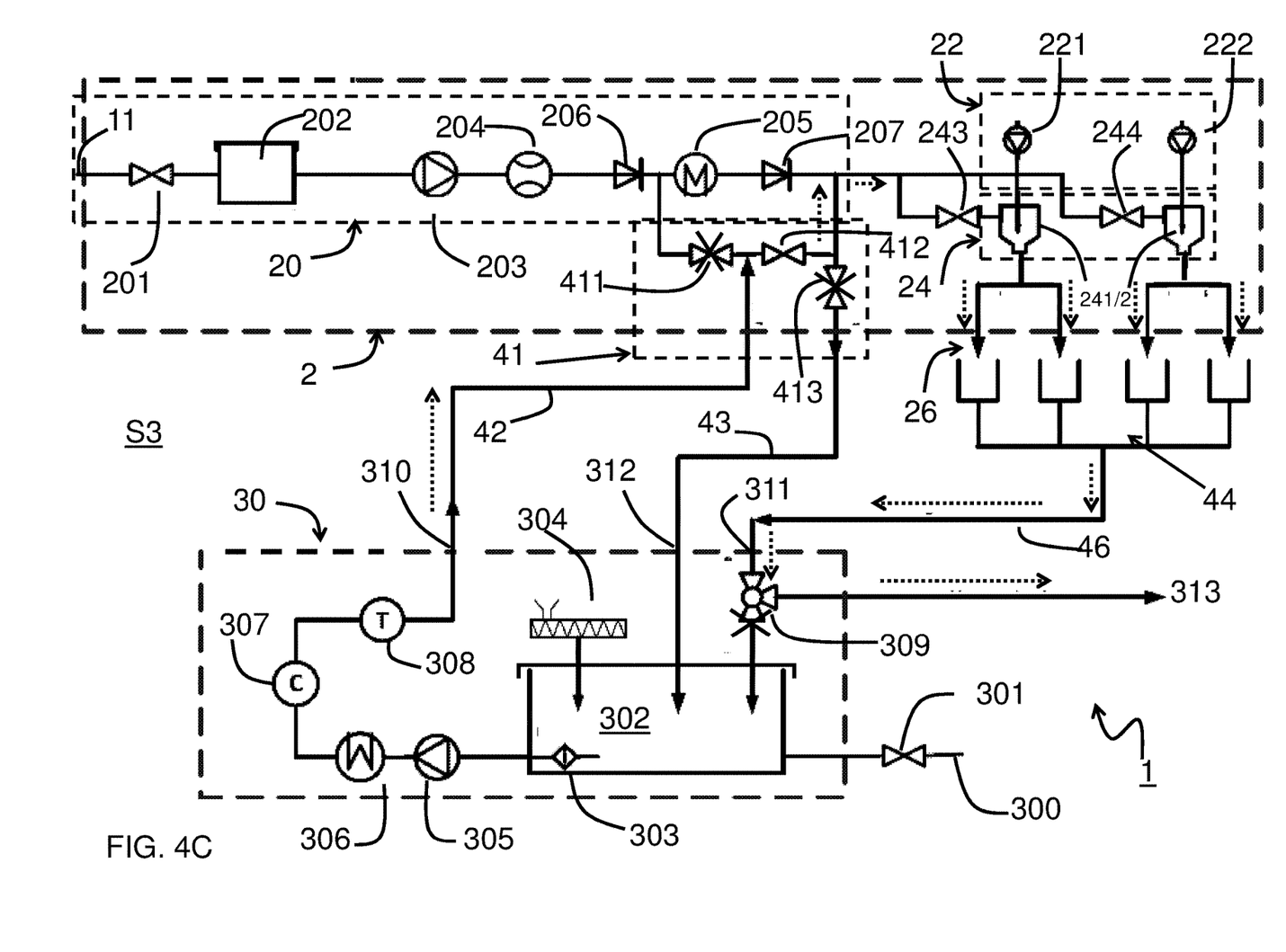

FIG. 4C shows the third step S3 in more detail. As in the first step, the rinsing fluid may be water, e.g. cold or lukewarm water, e.g. 20 to 40 degrees ° C. Typically, multiway valve 309 will be set to re direct the used rinsing fluid towards outlet 313.

Figure 5A:
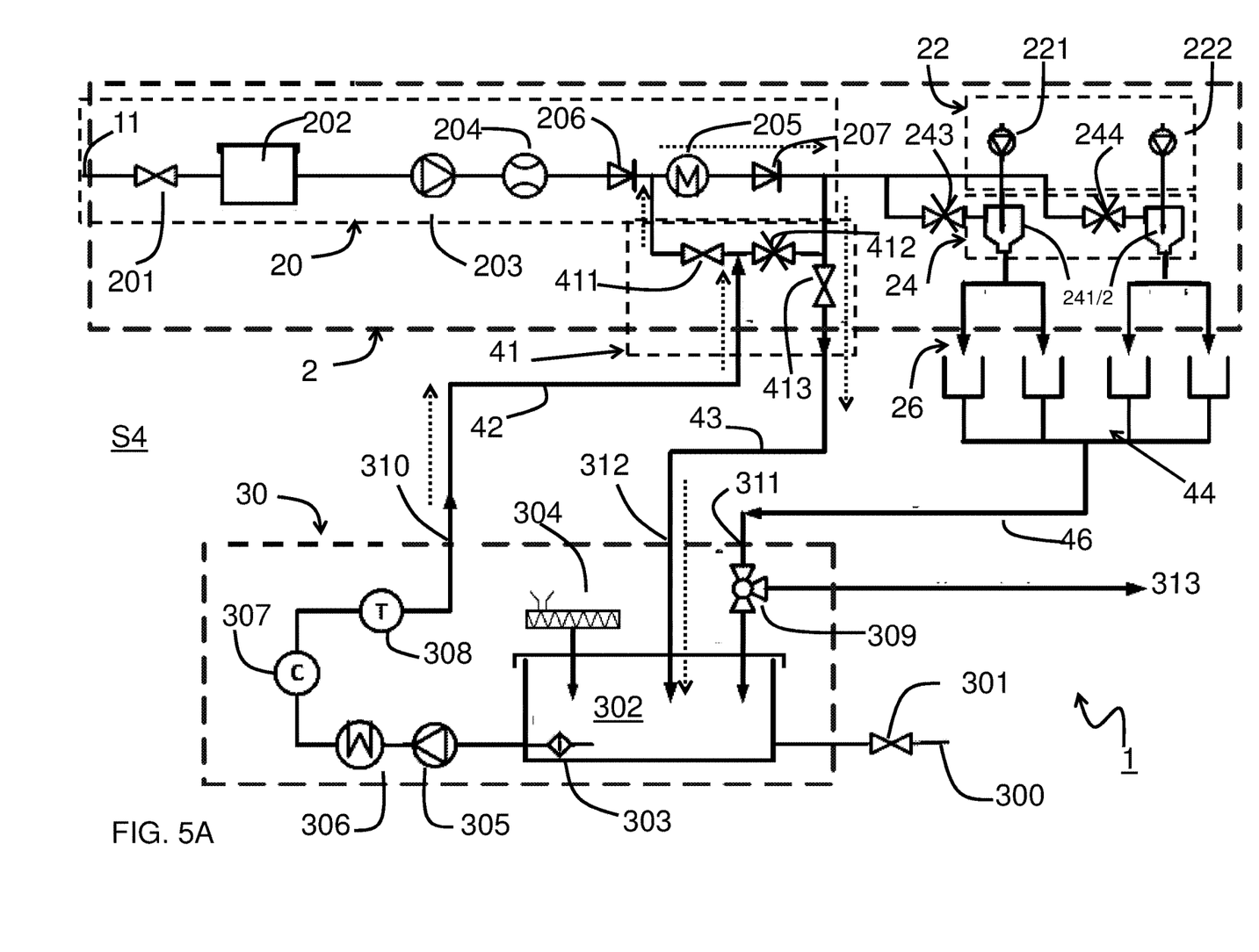

FIG. 5A shows an optional descaling step S4. In this step a treatment fluid, typically including a descaling agent is provided at outlet 310 via conduit 42 to the fluid interface 41. The supplied treatment fluid is redirected via valve 411 towards an inlet of the heater 205 and returned to an inlet 312 of the cleansing module via one-way valve 207, opened valve 413 and conduit 43. For best results the treatment fluid is heated to a temperature above 80 degrees ° C., preferably above 80 degrees ° C., for example to 95 degrees ° C. As the treatment fluid is returned to the reservoir 302, it can be efficiently used with a relatively modest amount of electric energy. During the descaling step S4, the presence of the descaling agent in the treatment fluid may be verified from a reading of conductivity sensor 307, that is, the conductivity of the treatment fluid is increased by the presence of the descaling agent therein.

Figure 5B:
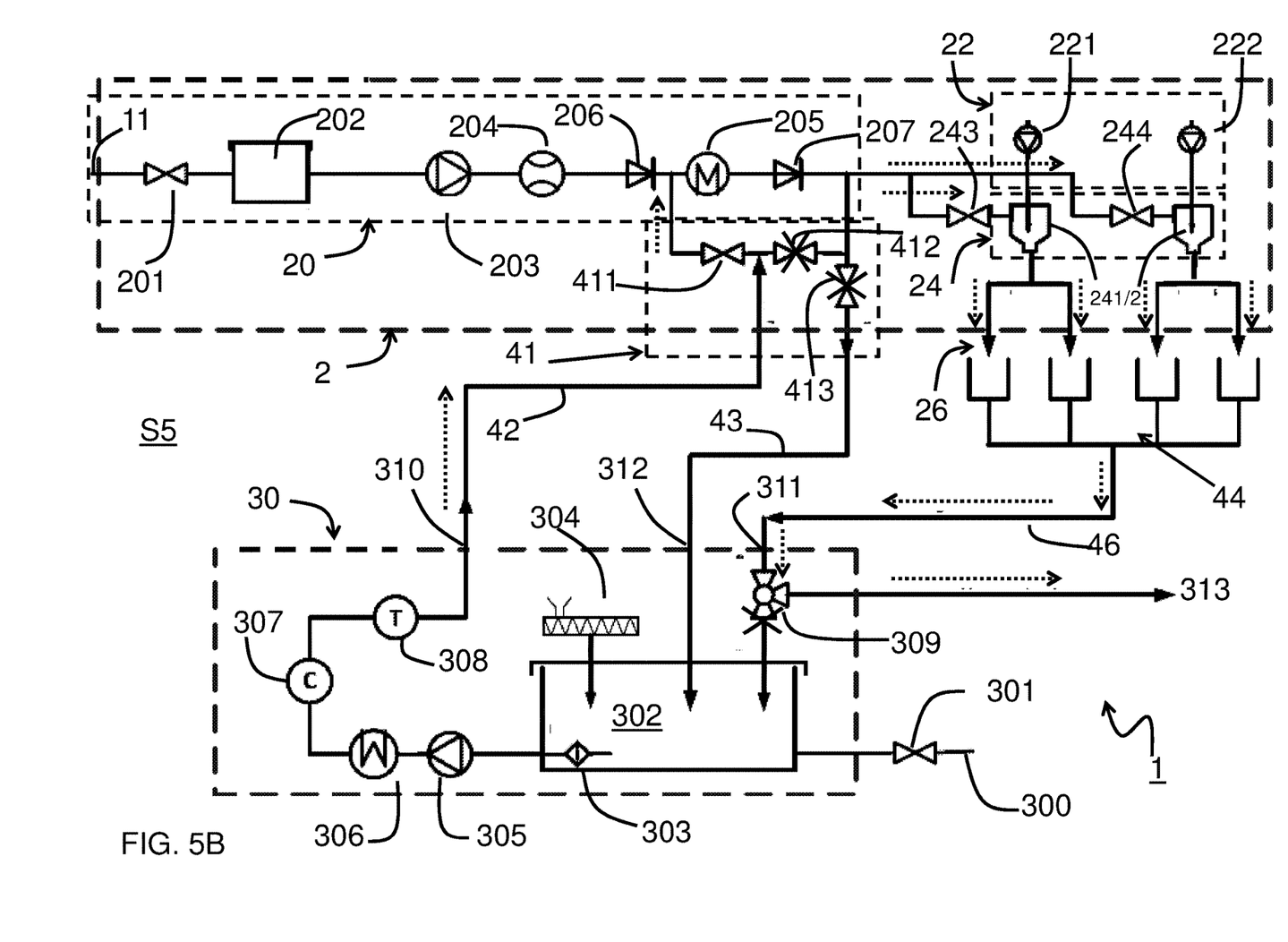

FIG. 5B shows a rinsing step S5 following the de scaling step S4. As in step S3, the relevant parts of the hot beverage preparation module 2 are rinsed with cold or lukewarm water, in this case remove descaling agent from these parts.

Figures 6, 6A:
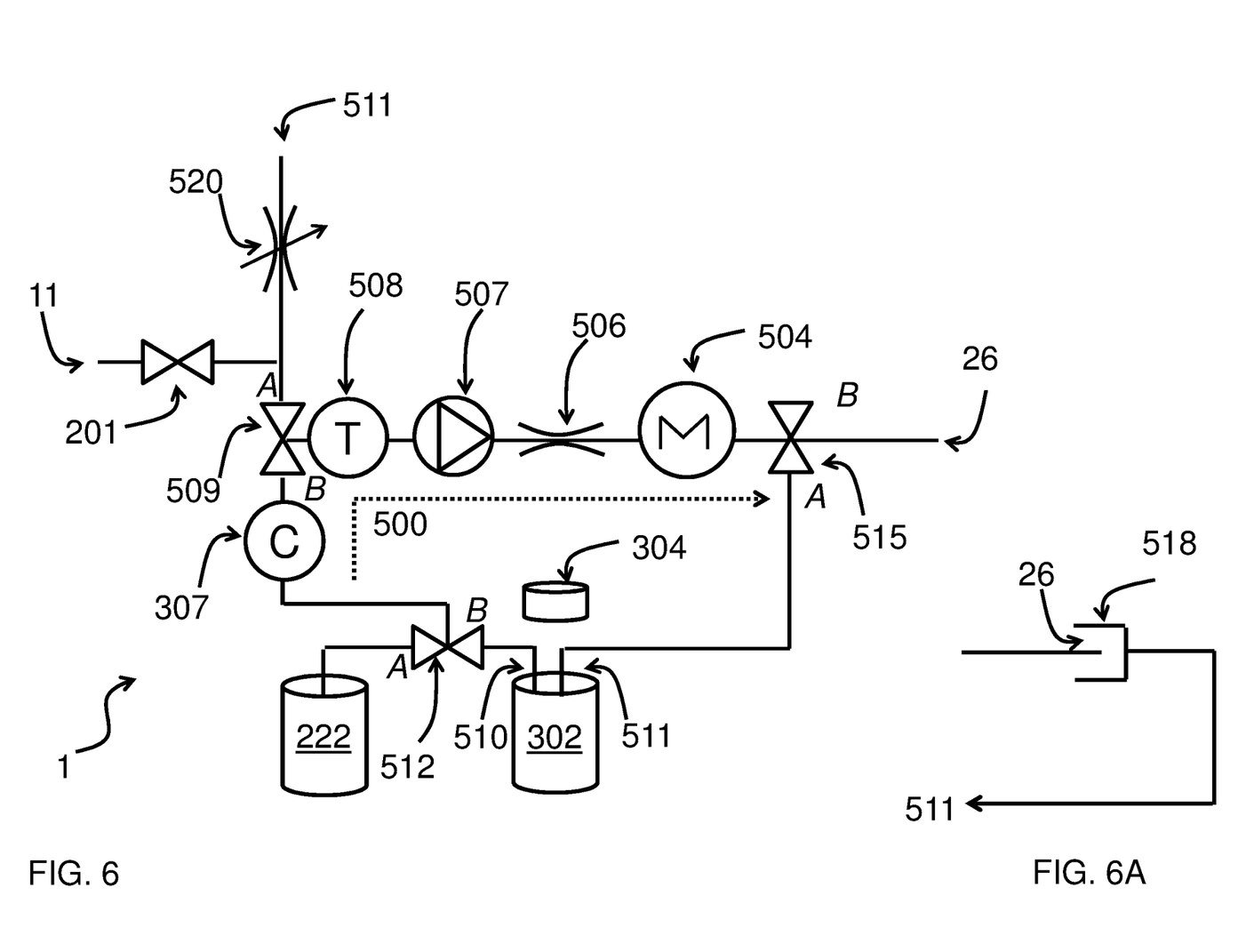

FIG. 6 schematically shows a further embodiment of a hot beverage preparation device 1 according to the present invention. The hot beverage preparation device is in particular suitable for preparation of foamed milk. The hot beverage preparation device of FIG. 6 may, for example, be integrated with a hot beverage preparation device of FIG. 1 and/or FIG. 3 into a beverage preparation system.

The device of FIG. 1 comprises a water inlet 11, a hot beverage preparation module 2 located downstream of the water inlet, and a beverage outlet 21. The water inlet 11 is coupled via an inlet valve 201 to a selection valve 509, a temperature sensor 508, a pump 507, a flow restriction 506, a heater 504 and a redirection valve 515 to an outlet 26. The device also includes a reservoir 222, e.g. for milk and a reservoir 302 for rinsing/treatment fluid. A second input of selection valve 509 is coupled via a conductivity sensor 307 to an outlet of a further selection valve 512 having respective inputs coupled to each of the reservoirs 222, 302.

The hot beverage dispensing device 1 of FIG. 6 comprises a fluid transport trajectory 500 with at least one of a pump 507 and a heater 504. In FIG. 6 both a pump and a heater are present. In the first operational mode the device provides an ingredient as a component of the hot beverage via the fluid transport trajectory to the beverage outlet 26. More in particular, in the first operational mode, the ingredient in reservoir 222, e.g. milk is pumped via valve 512 and via conductivity sensor to a first inlet of valve 509, while mixing the milk with water obtained from inlet 11 and air obtained from inlet 511 via controllable restriction 510. The mixture is then guided via the temperature sensor 508, through the pump 507 and restriction 506 to heater 504 where it is heated to a desired temperature and dispensed at outlet 26. In this mode, a second input of valve 512 which is coupled to outlet 510 of reservoir 302 is closed and a second output of selection valve 515 which is coupled to inlet 511 of reservoir 302 is also closed.

In the second operational mode of the device, a flow of rinsing or treatment fluid is induced through the fluid transport trajectory 500. More specifically, selection valve 512 is set to selectively receive the rinsing/treatment fluid from the outlet 510 of the reservoir 302 which is provided to the fluid transport trajectory 500. Depending on the step performed in the second operational mode, the rinsing/treatment fluid may be either disposed at the outlet 26, or may be returned to the inlet 511 of the fluid reservoir.

In the embodiment shown the fluid transport trajectory 500 further includes a conductivity sensor 307 and a temperature sensor 508. In an alternative arrangement, a flow sensor may be included.

As mentioned above, the hot beverage dispensing device of FIG. 6 includes a flow direction element 515 arranged upstream of the outlet 26 which is configured to selectively redirect a flow of fluid streaming in a direction of the outlet 26 towards a rinsing/treatment fluid reservoir 302. In this way, for example, a treatment fluid can be circulated for a more efficient use with a treatment agent dissolved therein. Also energy consumption can be reduced therewith.

As an alternative for a flow direction element 515, a fluid capture element 518 may be provided. As schematically illustrated in FIG. 6A. the fluid capture element 518 is arranged downstream of the outlet 26. The hot beverage dispensing device is configured to selectively couple the fluid capture element 518 with the outlet 26 to capture fluid leaving the outlet and to redirect the fluid towards a rinsing/treatment fluid reservoir 302. A sealing may be provided to avoid any fluid leakage between this coupling.

Figure 7:
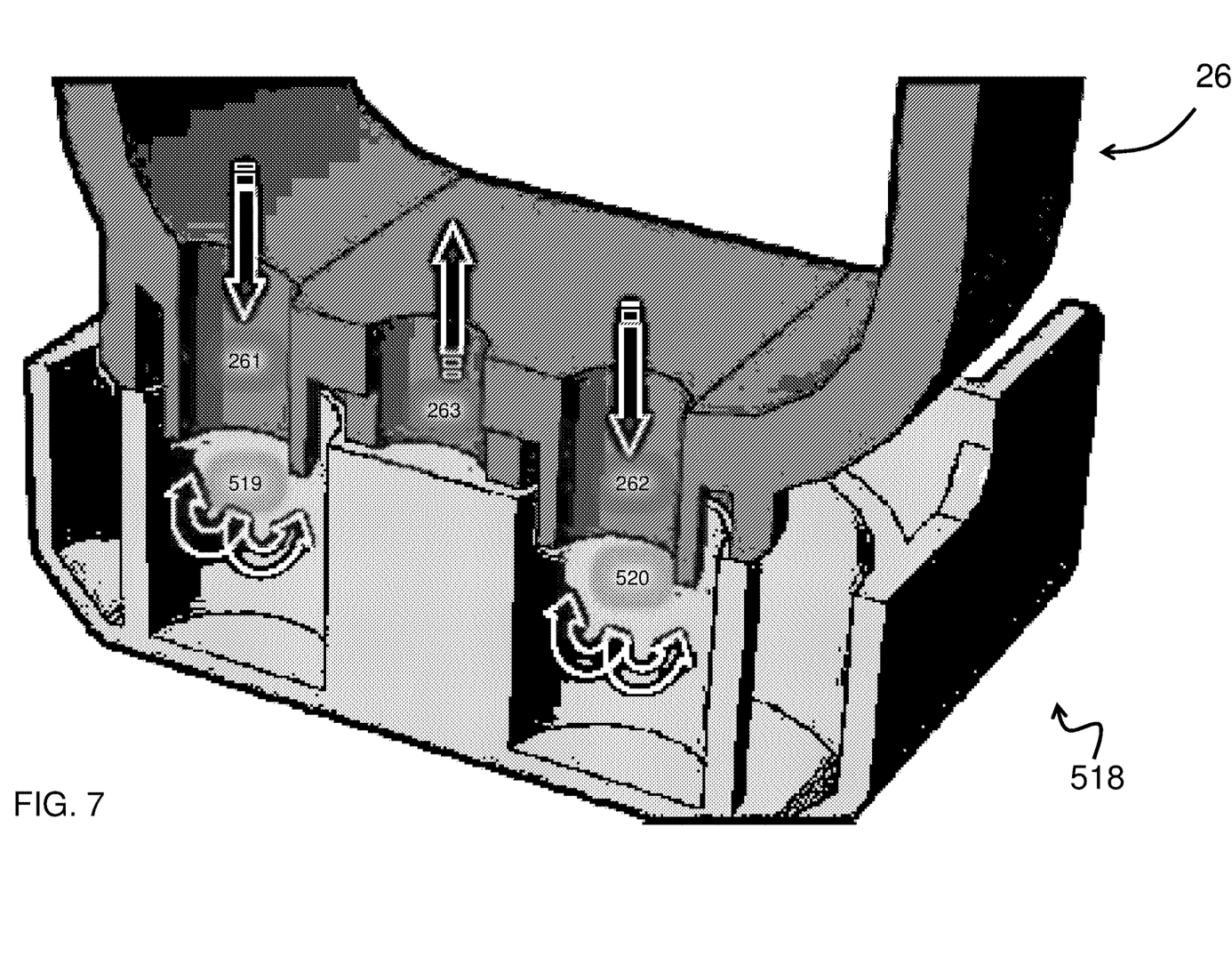
FIG. 7 illustrates an exemplary embodiment of the part of FIG. 6A.

FIG. 7 shows a particular embodiment of a fluid capture element 518. In this embodiment the outlet 26 comprises at least one outlet opening 261, 262 and at least one return opening 263 which is coupled to a drain conduit (for example towards the inlet 511 of reservoir 302, or to conduit 46 of FIG. 3). When the fluid capture element 518 is coupled with the outlet 26 it causes the fluid to return via the return opening 263 to flow into the drain conduit. The fluid capture element 518 in this case has cavities 519, 520 that receive respective protrusions of the outlet 26 in the coupled state. It is a particular advantage of this embodiment that the rinsing/treatment liquid circulates in a turbulent manner around these protrusions, which also intensively cleans the outside of the protrusions.

An embodiment of the method according to the present invention as applied in the device of FIG. 6 is now discussed with reference to the following Table. As indicated in the first column, the first rinsing step comprises a sequence of substeps S101 to S113. The first treatment step comprises substeps S201 to S212 and the second rinsing step comprises S301 to S305. The purpose of each substep is summarized in the second column and the settings for the various elements is indicated in the subsequent columns. In column "201" the value "0", "1" respectively indicates that the valve 201 is closed or opened. The value in column 507 indicates the operation of the pump 507. A value 0 indicates that the pump is switched off, a value 1 indicates that it is operated at full capacity. A value between 0 and 1 indicates that it is operated at the corresponding value of its capacity, for example 0.2 in state S103 indicates that it operates at 20% of its full capacity. Column 504 indicates a temperature in degrees ° C., set for the heater 504. A value 0 means that the heater is switched off.

Columns 509 and 512 indicate a side A or B of the selected inlet. For example in state S103, valve 509 opens inlet A coupled to output of valve 201, and valve 512 opens inlet B, coupled to the cleansing liquid reservoir 302. Column 515 indicates the output of valve 515 to which the fluid is directed. "A" means output A towards reservoir 302 is selected and "B" means output B towards outlet 26 is selected.

Finally, column 520 indicates the setting of air valve 520: 0 is closed, 1 is open and 0/1 means that the valve is alternately opened and closed.

| STATE | GOAL | 201 | 507 | 504 | 509 | 512 | 515 | 520 |
|---|---|---|---|---|---|---|---|---|
| S101 | Empty tubes | 0 | 1 | 0 | B | B | B | 0 |
| S102 | Empty tubes | 0 | 1 | 0 | B | B | B | 0 |
| S103 | Fill Reservoir | 1 | 0.2 | 45 | A | B | A | 0 |
| S104 | Fill Reservoir | 1 | 0.2 | 45 | A | B | A | 0 |
| S106 | Drain Reservoir | 0 | 1 | 0 | B | B | B | 0 |
| S107 | Drain Reservoir | 0 | 1 | 0 | B | B | B | 0 |
| S113 | Stop pre rinse | 0 | 0 | 0 | X | X | X | 0 |
| S201 | Start heater | 1 | 1 | 75 | A | B | B | 0 |
| S202 | Rinse Line | 1 | 0.15 | 75 | A | B | B | 0 |
| S203 | Fill Reservoir | 1 | 0.3 | 75 | A | B | A | 0 |
| S204 | Restart Heater | 0 | 0.3 | 75 | B | B | B | 0 |
| S205 | Start Circulation | 0 | 0.3 | 75 | B | B | B | 0 |
| S206 | Dispense Tablet | 0 | 0 | 0 | X | X | X | 0 |
| S207 | Start Heater | 0 | 0 | 95 | X | X | X | 0 |
| S208 | Fill Reservoir | 1 | 0.3 | 95 | A | B | A | 0 |
| S209 | Heat 80 | 0 | 0.3 | 95 | B | B | A | 0 |
| S210 | Circulation | 0 | 1 | 95 | B | B | A | 0/1 |
| S211 | Drain reservoir | 0 | 1 | 0 | B | B | B | 0 |
| S212 | Drain tubes | 0 | 1 | 0 | A | B | B | 1 |
| S301 | Drain Reservoir | 0 | 1 | 0 | B | B | B | 0 |
| S302 | Fill Reservoir | 1 | 1 | 0 | A | B | A | 0 |
| S303 | Drain Reservoir | 0 | 1 | 0 | B | B | B | 0 |
| S304 | Drain Tubes | 0 | 1 | 0 | B | B | B | 1 |
| S305 | Wait for Tnormal | 0 | 0 | 0 | X | X | X | 0 |

In summary, by controlling the settings according to this table, the substeps S101 and S102 of the first rinsing step first empty the fluid transport trajectory 500.

In substep S101, the pump 507 is activated at its full capacity to substantially remove remaining liquid from the trajectory 500. A conductivity value may be monitored with sensor 307, and an error message may be given if an unexpected value is measured. This may indicate an improper operation, for example indicating that no remainders of milk are detected.

In the next substeps S103, A104 the reservoir 302 is filled with tap water which is heated in the fluid transport trajectory 500 by heater 504. Subsequently in substeps S106 and S107, the water is pumped from the reservoir 302 via the fluid transport trajectory 500 to outlet 26, to remove the contaminated rinsing liquid from the reservoir 302 and the fluid transport trajectory 500. Operation of the system is paused for a few seconds in substep S113, before preceding to the next sequence of substeps S201-S212.

In this subsequent series of substeps, i.e. substeps of a treatment step S2, the reservoir is first filled with heated water in substeps S201-S203. In substeps S204, S205 the water is heated and circulated for some time until it reaches a desired temperature, e.g. at least 60 degrees ° C. After this temperature is achieved, a treatment agent is dosed by treatment agent dosing device 304 in substep S206. Subsequently, the heater 504 is reactivated (substep S207), additional water is supplied (S208) and when the treatment agent is dissolved therein, the treatment fluid is circulated through the fluid transport trajectory 500, valve 515 and reservoir 302 in substep S209.

In substep S210 treatment is intensified by periodically supplying air into the treatment fluid via valve 520. For example, every ten seconds, air is supplied for a period lasting a few seconds. For example, during circulation of the treatment fluid, air may be supplied every 20 seconds for a period of 4 seconds. This cycle may be repeated for a few times, e.g. 5 times. Upon completion of this treatment, the reservoir 302 is drained in substep S211 and the fluid transport trajectory 500 is drained in substep S212. In substep S212 valve 520 is opened to allow the supplied air to expel a substantial amount of remaining fluids from the fluid transport trajectory 500.

Subsequently a second rinsing step S3 follows with substeps S301-S305. In substep S302, the reservoir is filled with tap water. As an additional precaution substep S302 may be preceded by an additional reservoir draining substep S301. When the reservoir 302 is filled, it is drained via the fluid transport trajectory 500 and the rinsing fluid is disposed via outlet 26. Subsequently, further remaining fluid is disposed by allowing air to enter valve 520. In this case a final substep S304 proceeds to allow the device to cool down before proceeding further.

Figure 8:
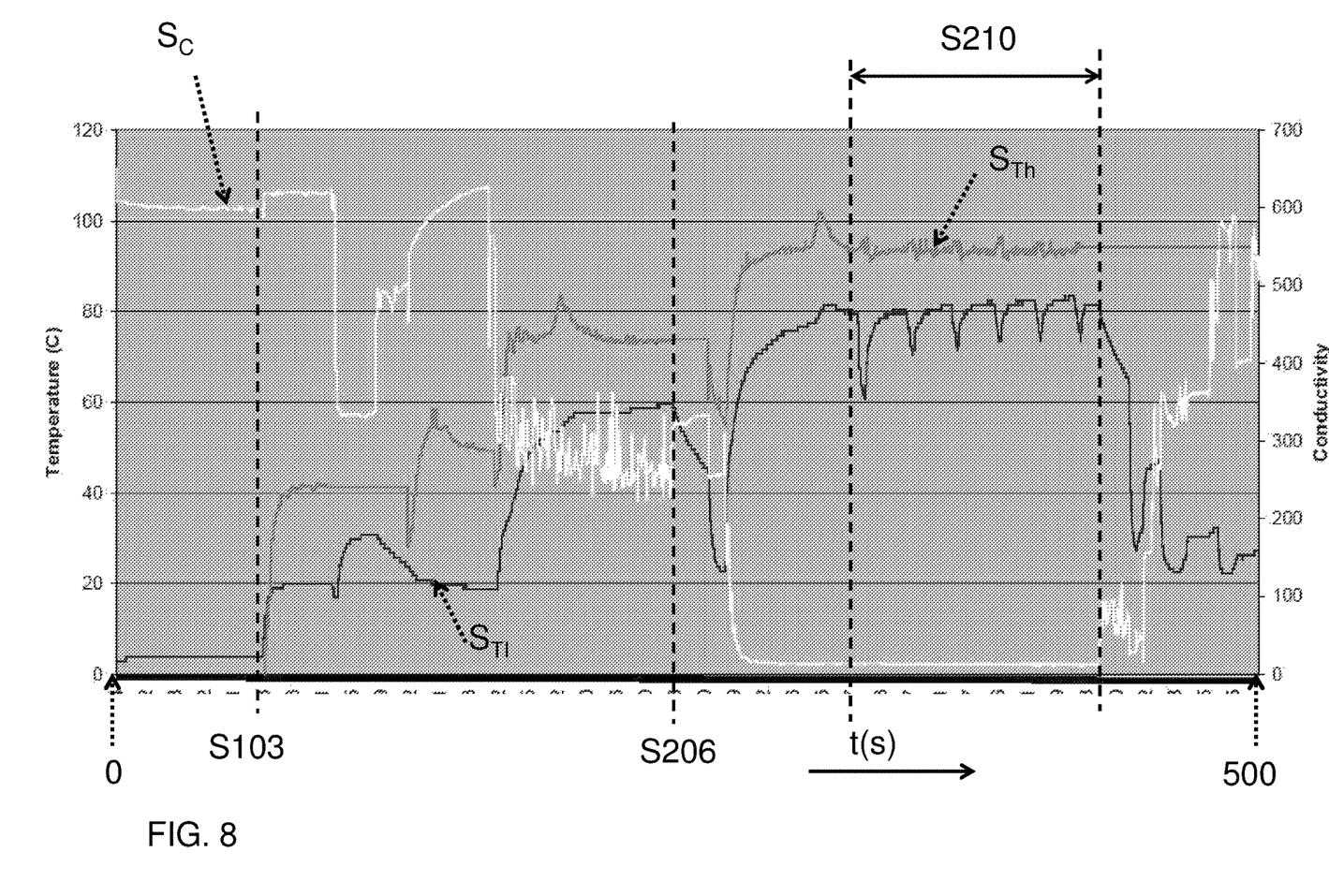
FIG. 8 shows various sensor readings obtained during operation of the device of FIG. 6 in its second mode.

FIG. 8 shows sensor readings $S_C$, $S_{TH}$ and $S_{TL}$ as obtained during the cleansing cycle as presented with reference to the table above. The left side indicates the temperature scale for readings $S_{TH}$ and $S_{TL}$, in a range from 0 to 120 degrees ° C. The right side indicates a conductivity scale for the value $S_C$ extending from 0 to 700. A value 0 indicates a relatively high conductivity and the value 700 indicates a relatively low conductivity. The horizontal axis indicates the time lapsed in seconds from the start of the cleaning cycle. FIG. 8 for example demonstrates the rapid increase of conductivity after dosing the detergent in substep S206 and the fluctuations in rinsing fluid temperature measured during substep S201, when air is periodically added.

The invention claimed is:

1. A hot beverage dispensing device including at least one water inlet, a hot beverage preparation module located downstream of the water inlet, a beverage outlet located downstream of the beverage preparation module for delivery of a prepared beverage to a receptacle in a first operational mode of the device, wherein the beverage dispensing device further includes a cleansing module, which in a second operational mode of the device, subsequently performs a first rinsing step, a treatment step and a second rinsing step, wherein:

the first rinsing step comprises rinsing at least part of the beverage preparation module and the beverage outlet with a rinsing fluid having a first rinsing fluid temperature;

the treatment step comprises treating at least part of the beverage preparation module and the beverage outlet with a treatment fluid, the treatment fluid having a temperature that is higher than the first rinsing fluid temperature; and the second rinsing step comprises rinsing at least part of the beverage preparation module and the beverage outlet with a rinsing fluid having a second rinsing fluid temperature, the hot beverage dispensing device further including a fluid capture element arranged downstream with respect to the beverage outlet, the hot beverage dispensing device being configured to selectively couple a cavity of the fluid capture element with the beverage outlet to capture fluid leaving the outlet and to redirect the fluid towards a rinsing and/or treatment fluid reservoir, wherein the beverage outlet comprises at least one outlet opening and at least one return opening coupled to a drain conduit that fluidly connects to the rinsing and/or treatment reservoir, wherein the fluid capture element when coupled with the beverage outlet causes the fluid to return via the return opening to flow into the drain conduit.

2. The method according to claim 1, wherein at least one of the first rinsing step and second rinsing step, is carried out using cold water.

3. The method according to claim 1, wherein the treatment fluid is provided with an active ingredient.

4. The method according to claim 1, wherein a temperature of the treatment fluid is at least 50° C.

5. The method according to claim 1, wherein at least the beverage outlet is cleaned by the rinsing steps and treatment step.

6. The method according to claim 1, wherein the hot beverage preparation module includes a water heater wherein the method includes a water heater descaling process, including a water heater treatment step and a water heater rinsing step.

7. A method for cleaning the hot beverage dispensing device of claim 1, the method including:

performing the first rinsing step of rinsing at least part of the beverage preparation module and the beverage outlet with a rinsing fluid having a first rinsing fluid temperature;

performing the treatment step of treating at least part of the beverage preparation module and the beverage outlet with a treatment fluid, the treatment fluid having a temperature that is higher than the first rinsing fluid temperature; and performing the second rinsing step of rinsing at least part of the beverage preparation module and the beverage outlet with a rinsing fluid having a second rinsing fluid temperature.

8. The method according to claim 1, wherein the treatment fluid leaves the beverage outlet and is collected and reused.

9. The method according to claim 1, including measuring a conductivity of the treatment fluid and/or the rinsing fluid.

10. The method according to claim 9 wherein the conductivity measurement(s) are used to assess a level of active ingredient in the fluid(s).

11. The method according to claim 1, wherein flow rate of the rinsing fluid or the treatment fluid is determined from a difference between a temperature of the rinsing fluid or the treatment fluid measured respectively at two positions, one position being downstream of a heater and a second position being up stream of the heater.

12. The method according to claim 1, wherein a gas is added to the flow of rinsing fluid and/or flow of treatment fluid in a pulsating manner.

13. The method according to claim 7, wherein the rinsing fluids leaves the beverage outlet and are collected and reused.

14. The hot beverage dispensing device according to claim 13, wherein the hot beverage preparation module includes a hot water supply section to supply hot water, an ingredient supply section to supply one or more ingredients, and a combining section to prepare a beverage from the supplied hot water and the supplied one or more ingredients to supply the prepared beverage to the beverage outlet for supply of the prepared beverage to a receptacle.

15. The hot beverage dispensing device according to claim 13, comprising a fluid transport trajectory with at least one of a pump and heater, wherein the device in its first operational mode provides an ingredient as a component of the hot beverage via the fluid transport trajectory to the beverage outlet, and wherein the device in its second operational mode induces a flow of rinsing or treatment fluid through the fluid transport trajectory.

16. The hot beverage dispensing device according to claim 15, wherein the fluid transport trajectory further comprises at least one of a conductivity sensor, a flow sensor, or a temperature sensor.

17. The hot beverage dispensing device according to claim 15, wherein an inlet of the fluid transport trajectory is coupled via a selection valve to an ingredient reservoir for said ingredient and to a rinsing and/or treatment fluid reservoir, wherein in said first operational mode and said second operational mode, the selection valve respectively selects the ingredient reservoir and the rinsing and/or treatment fluid reservoir as input for the fluid transport trajectory.

18. The hot beverage dispensing device according to claim 13, further including a flow direction element arranged upstream with respect to the beverage outlet, which is configured to selectively redirect a flow of fluid streaming in a direction of the beverage outlet towards a rinsing and/or treatment fluid reservoir.

* * * * *